(12) United States Patent
Goodno et al.

(10) Patent No.: US 10,756,504 B2
(45) Date of Patent: Aug. 25, 2020

(54) SPECTRALLY COMPENSATED FIBER AMPLIFIER SYSTEM

(71) Applicant: NORTHROP GRUMMAN SYSTEMS CORPORATION, Falls Church, VA (US)

(72) Inventors: Gregory D. Goodno, Los Angeles, CA (US); Joshua E. Rothenberg, Los Angeles, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 396 days.

(21) Appl. No.: 15/942,240

(22) Filed: Mar. 30, 2018

(65) Prior Publication Data

US 2019/0305505 A1   Oct. 3, 2019

(51) Int. Cl.
*H01S 3/10* (2006.01)
*H01S 3/067* (2006.01)
(Continued)

(52) U.S. Cl.
CPC ........... *H01S 3/10015* (2013.01); *H01S 3/04* (2013.01); *H01S 3/06754* (2013.01); *H01S 3/1003* (2013.01); *H01S 3/10038* (2013.01); *H01S 3/10053* (2013.01); *H01S 3/10061* (2013.01); *H01S 3/1301* (2013.01); *H01S 3/1306* (2013.01); *H01S 3/1308* (2013.01); *H01S 3/2308* (2013.01); *H01S 3/2391* (2013.01);
(Continued)

(58) Field of Classification Search
CPC ............... H01S 3/10015; H01S 3/0401; H01S 3/06754; H01S 3/10038; H01S 3/10053
See application file for complete search history.

(56) References Cited

U.S. PATENT DOCUMENTS

| | | | |
|---|---|---|---|
| 6,678,294 B1 | 1/2004 | Komine et al. | |
| 9,036,252 B1 * | 5/2015 | Goodno | H01S 3/06754 359/341.3 |

(Continued)

OTHER PUBLICATIONS

Rao, Li, Qiao, Zhi, Wang, Xiaochao, Fan, Wei and Lin, Zungi; "High-energy master-oscillator power amplifier with near-diffraction-limited output based on ytterbium-doped PCT Fiber", Proceedings of SPIE; vol. 10457, Oct. 24, 2017, pp. 104570E-1 to 104570E-8.

(Continued)

*Primary Examiner* — Eric L Bolda
(74) *Attorney, Agent, or Firm* — Shumaker, Loop & Kendrick, LLP; John A. Miller

(57) ABSTRACT

A fiber amplifier system including a plurality of optical components in an amplification chain that are responsive to a seed beam and that cause frequency modulation (FM) to amplitude modulation (AM) conversion to the seed beam that creates a non-uniform spectral transmission having a transmission function, where one of the optical components is a fiber amplifier generating an amplified output beam. A programmable spectral filter is controlled to pre-distort the seed beam by applying an inverse of the transmission function that creates a net uniform transmission function by equalizing a net spectral transmission profile of the seed beam at an end of the amplification chain to reduce the amplitude modulation.

20 Claims, 6 Drawing Sheets

(51) Int. Cl.
  *H01S 3/04* (2006.01)
  *H01S 3/23* (2006.01)
  *H01S 3/00* (2006.01)
  *H01S 3/13* (2006.01)
(52) U.S. Cl.
  CPC ............ *H01S 3/005* (2013.01); *H01S 3/0085* (2013.01); *H01S 3/1305* (2013.01); *H01S 2301/02* (2013.01); *H01S 2301/03* (2013.01)

(56) References Cited

U.S. PATENT DOCUMENTS

| | | | |
|---|---|---|---|
| 9,106,051 B1 | 8/2015 | Goodno et al. | |
| 2012/0188626 A1* | 7/2012 | Rothenberg | H01S 3/06712 359/239 |
| 2013/0107257 A1 | 5/2013 | Goodno et al. | |
| 2019/0190225 A1* | 6/2019 | Goodno | H01S 3/0057 |

OTHER PUBLICATIONS

Zhang, Rui, Tian, Xiaocheng, Xu, Dangpeng, Zhou, Dandan, Zong, Zhaoyu, Li, Hongxum, Fan, Mengqiu, Huang, Zhihua, Zhu, Na, Su, Jingqin, Zhu, Qihua and Jing, Feng; "Polarized Millijoule fiber laser systems with high beam quality and pulse shaping ability", Proceedings of SPIE; vol. 10192, May 1, 2017, pp. 1019207-1 to 1019207-7.

Xue, Li, Wang, Shiwei, Li, Ming and Wang, Liangliang; "FM-to-AM Conversion Comparison of Typical Second-order Phase Modulation Signals",IEEE, Apr. 24, 2015, pp. 547-552.

Xu, Dangpeng, Huang, Zhihua, Wang, Jianjun, Li, Mingzhong, Lin, Honghuan, Zhang, Riu, Zhu, Rui, Zhang, Yongliang and Tian, Xiaocheng; "A fiber-based polarization-rotation filter utilized to suppress the FM-to-AM effect in a large-scale laser facility", Journal of Optics, Institute of Physics Publishing, vol. 15, No. 8, Jul. 22, 2013, pp. 1-4.

Rothenberg, Joshua E., Brown, Donald F. and Wilcox, Russell B.; "The issue of FM to AM conversion on the National Ignition Facility"; SPIE vol. 3492-0277-786X-99; pp. 51-61.

Waxer, L.J., Kelly, J.H., Rothenberg, J., Babushkin, A., Bibeau, C., Bayramian, A. and Payne, S.; "Precision spectral sculpting for narrow-band amplification of broadband frequency-modulated pulses"; Optic Letters; 2002 Optical Society of America; Aug. 15, 2002; vol. 27, No. 16; pp. 1427-1429.

\* cited by examiner

SPECTRALLY COMPENSATED FIBER AMPLIFIER SYSTEM

BACKGROUND

Field

This disclosure relates generally to a fiber laser amplifier that provides active reduction of frequency modulation (FM) to amplitude modulation (AM) conversion and, more particularly, to a fiber laser amplifier that reduces FM to AM conversion in the amplifier by providing spectral equalization to a seed beam using a programmable spectral filter.

Discussion

High power laser amplifiers have many applications, including industrial, commercial, military, etc. Designers of laser amplifiers are continuously investigating ways to increase the power of the laser amplifier for these and other applications. One known type of laser amplifier is a fiber laser amplifier that employs a doped fiber that receives a seed beam and a pump beam that amplifies the seed beam and generates the high power laser beam, where the fiber has an active core diameter of about 10-20 μm or larger. Fiber laser amplifiers are useful as energy sources for directed energy weapons because of their high efficiency, high power scalability and excellent beam quality.

Improvements in fiber laser amplifier designs have increased the output power of the fiber to approach its practical power and beam quality limit. To further increase the output power of a fiber amplifier some fiber laser systems employ multiple fiber laser amplifiers that combine the amplified beams in some fashion to generate higher powers. A design challenge for fiber laser amplifier systems of this type is to combine the beams from a plurality of fiber amplifiers in a manner so that the beams provide a single beam output such that the beam can be focused to a small focal spot. Focusing the combined beam to a small spot at a long distance (far-field) defines the quality of the beam.

In one known multiple fiber amplifier design called coherent beam combining (CBC), a master oscillator (MO) generates a seed beam that is split into a plurality of fiber seed beams each having a common wavelength, where each fiber beam is amplified. The amplified fiber seed beams are then directed to a diffractive optical element (DOE) that combines the coherent fiber beams into a single output beam. The DOE has a periodic structure formed into the element so that when the individual fiber beams each having a slightly different angular direction are redirected by the periodic structure all of the beams diffract from the DOE in the same direction. Each fiber beam is provided to a phase modulator that controls the phase of the beam so that the phase of all the fiber beams is maintained coherent. However, limitations on phase control bandwidth and wavefront errors limit the number of fiber beams that can be coherently combined, thus limiting the output power of the laser.

In another known multiple fiber amplifier design called spectral beam combining (SBC), a plurality of master oscillators (MOs) generate a plurality of fiber seed beams at a plurality of wavelengths, where each fiber seed beam is amplified. The amplified fiber seed beams are then directed to a diffraction grating, or other wavelength-selective element, that combines the different wavelength fiber beams into a single output beam. The diffraction grating has a periodic structure formed into the element so that when the individual fiber beams each having a slightly different wavelength and angular direction are redirected by the periodic structure all of the beams diffract from the diffraction grating in the same direction. However, limitations on spectral brightness limit the number of fiber beams that can be wavelength-combined, thus limiting the output power of the laser.

To overcome these limitations and further increase the laser beam power, multiple master oscillators can be provided to generate seed beams at different wavelengths, where each of the individual wavelength seed beams is split into a number of fiber seed beams and where each group of fiber seed beams has the same wavelength and are mutually coherent. Each group of the coherent fiber seed beams at a respective wavelength are first coherently combined by a DOE, and then each group of coherently combined beams are directed to an SBC grating at slightly different angles that diffracts the beams in the same direction as a single combined beam of multiple wavelengths. The SBC grating also includes a periodic structure for combining the beams at the different wavelengths.

When high power, single-mode light is amplified or propagates through long lengths of fiber, a host of non-linear effects can arise because of the fiber Kerr non-linearity that act to degrade the optical coherence or spectral purity of the beam. The most apparent manifestation of the Kerr non-linearity is typically self-phase modulation (SPM), which is parameterized by the B-integral, i.e., the non-linear phase shift, and which can degrade beam coherence by converting low levels of uncontrolled amplitude modulation (AM) into phase noise. This non-linear effect can limit the efficiency of CBC or the beam quality of SBC, hence reducing the performance of the laser system. Specifically, there is a loss of spectral purity or a loss of optical coherence.

To avoid or reduce these effects, it is generally desirable to limit the amount of AM, also known as relative intensity noise (RIN), propagating in the seed beam that seeds the fiber amplifier. Techniques that broaden the spectrum of the seed beam to provide frequency modulation without providing amplitude modulation can be implemented in a fiber amplifier, where if the seed beam is only frequency modulated, then the Kerr non-linearities will not create problems, i.e., no time dependent non-linear phase shifts of the seed beam. However, this results in spectral beam broadening, which could reduce beam quality during SBC.

Generally, to maintain the degradation of the beam quality defined by the Strehl ratio to be below 1% in a beam combined fiber laser weapon system, it is desirable to maintain non-linear SPM phase fluctuations B*RIN<0.1 radians. For a typical 1.5-2 kW fiber amplifier with a B-integral of 10 radians, this implies a requirement to maintain RIN<1%. Therefore, it is industry standard practice to employ FM seed beam sources having little or no AM, i.e., with constant power versus time. However, a number of effects have been observed that still partially convert FM into uncontrolled AM, where it can cause non-linear degradation through SPM. These effects include polarization mixing, chromatic dispersion, spectral filtering, or generally, any multi-path interference (MPI) effects. A typical signature of an MPI effect in a fiber component or fiber-based system is a spectrally dependent transmission that exhibits a periodic modulation pattern.

It is known in the art that for FM line-widths that are significantly smaller than the free spectral range (FSR) of the spectral modulation, the magnitude of the FM to AM conversion can vary significantly depending on the relative wavelengths of the seed beam and the spectral transmission peak. The FM to AM conversion in the fiber will be minimized when the beam wavelength is aligned with a peak or null of the transmission spectrum, and will be maximized when the beam wavelength is between a peak and a null. This is because the instantaneous frequency of the FM signal is changing in time, and thus its transmission amplitude will change in the time leading to the time-varying output power, i.e., AM. The FM to AM conversion will be minimized when the spectral transmission over the beam bandwidth is as uniform as possible, which occurs near a transmission peak or null. Hence, there is a need for a fiber amplifier architecture that can amplify FM light with a minimum FM to AM conversion to yield a low-noise output despite the presence of components that exhibit non-uniform spectral transmission.

DETAILED DESCRIPTION OF THE EMBODIMENTS

The following discussion of the embodiments of the disclosure directed to a fiber laser amplifier system that employs various techniques for actively reducing FM to AM conversion is merely exemplary in nature, and is in no way intended to limit the disclosure or its applications or uses.

As will be discussed in detail below, the present disclosure proposes various techniques for reducing FM to AM conversion in a fiber laser amplifier system by actively controlling a certain parameter in the system. These techniques can generally be separated into two types. The first type includes co-aligning the peaks or nulls of the spectral transmission caused by one or more amplifier components with a center wavelength of the seed beam. FM line-widths for 1-2 kW fiber amplifiers are typically 20-30 GHz that are driven by the requirement to stay below the threshold for stimulated Brillouin scattering in the fiber, which is small in comparison to typical measured FSRs on the order of ~100 GHz in various amplifier components. Hence, co-alignment of the center wavelength of the seed beam with the peaks or nulls of the transmission spectrum will minimize FM to AM conversion and will result in a low-noise FM fiber amplifier with reduced impairment from non-linear SPM noise. For example, since the spectral transmission of components within typical fiber amplifier systems can be polarization-dependent or temperature-dependent, the manual adjustment of the seed beam state of polarization (SOP) or component temperature can dramatically reduce the RIN on the amplified output beam.

The second type includes providing spectral equalization of the seed beam such as by employing a programmable spectral filter to compensate for spectral amplitude and phase distortions that initiate the FM to AM conversion. For spectral amplitude distortions, the spectral filter would be programmed to flatten the net spectral transmission profile through the fiber amplifier system. For spectral phase distortions, the spectral filter would be programmed to compensate for fiber group velocity dispersion (GVD) or other dispersive effects arising from amplification or component transmission spectrums. For static spectral phase correction, the spectral filter could also comprise a length of dispersion-compensating fiber used in series with the dynamic spectral filter, if this reduces the stroke required for compensation or improves precision.

Figure 1:
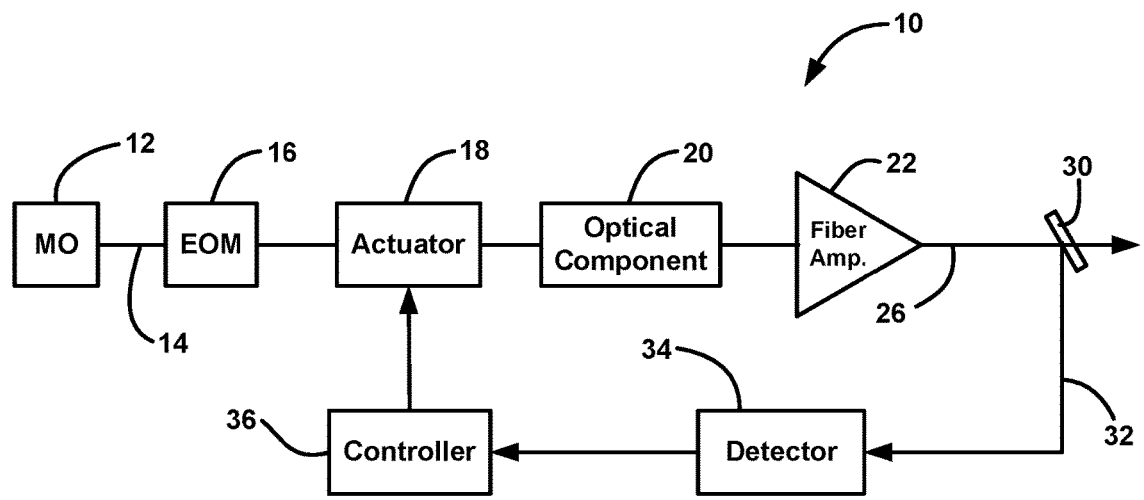
FIG. 1 is a schematic block diagram of a fiber laser amplifier system that reduces FM to AM conversion using active control.

Both of these types of techniques for reducing FM to AM conversion in a fiber laser amplifier system can be shown generally by fiber laser amplifier system 10 depicted in FIG. 1. The system 10 includes a master oscillator (MO) 12 that generates a seed beam on fiber 14 having a particular wavelength. The seed beam is provided to an RF electro-optical modulator (EOM) 16 that receives an RF signal to frequency modulate the seed beam for providing frequency modulation broadening, such as white noise or pseudo-random bit sequence (PRBS). It is noted that the EOM 16 can be at any suitable location in the system 10 before the seed beam is amplified. The broadened seed beam is then sent to an actuator 18 that controls some aspect or parameter of the seed beam, such as its phase, polarization, etc., for reducing FM to AM conversion as discussed herein. The actuated seed beam is then sent to an amplifier or optical component 20 that is intended to represent any of a number of optical components that may exist in the system 10 that provide a certain optical function depending on the particular application, and which may cause frequency modulation in the seed beam to be converted to amplitude modulation through SPM as discussed above. Suitable examples for the optical component 20 include, but are not limited to, a pump beam combiner, an optical splice, an optical isolator, a spectral filter, a length of optical fiber, a pre-amplifier stage, a mode field adapter, etc. It is noted that several of the components 20 can be employed.

The seed beam is then sent to a non-linear fiber amplifier 22, which may be a plurality of fiber amplification stages each including a pump beam source and a length of doped fiber, such as a ytterbium (Yb) doped length of fiber having a 10-20 µm core, to amplify the seed beam and provide an amplified output beam 26. The output beam 26 is then sent through a beam splitter 30 that splits off a small sample portion of the output beam 26 as a sample beam 32. The sample beam 32 is sent to a detector 34 that determines the amount or magnitude of the particular parameter being monitored that identifies AM in the amplified beam 26. The detector 34 generates a control metric that is sent to a controller 36 that controls the actuator 18 to adjust the parameter, thus optimizing the control metric and eliminating or reducing FM to AM conversion.

Figure 2:
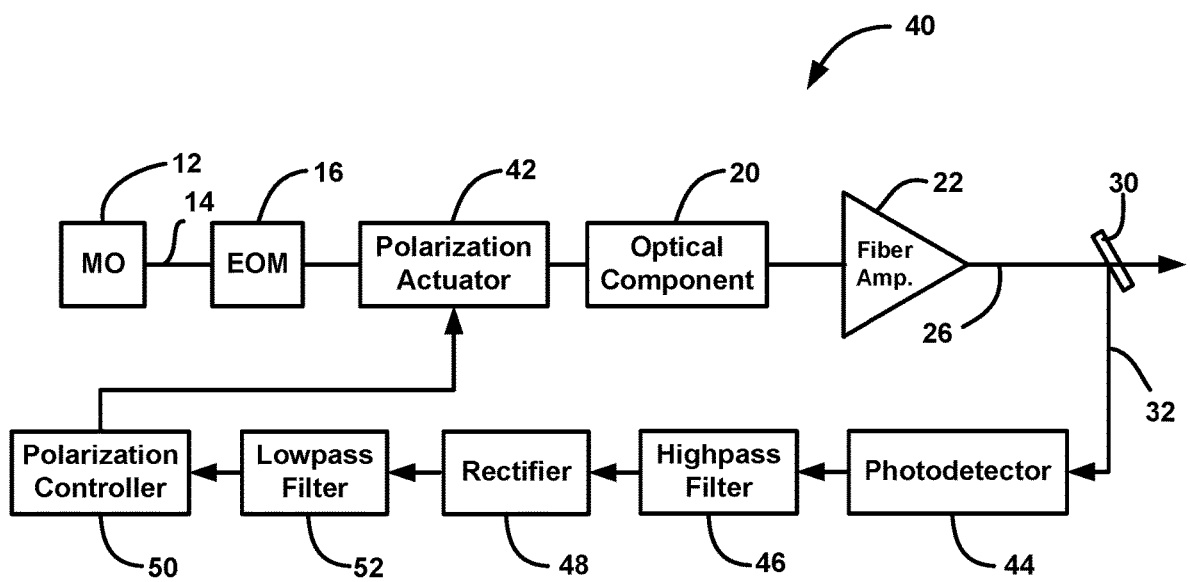
FIG. 2 is a schematic block diagram of a fiber laser amplifier system that reduces FM to AM conversion using active polarization control.

FIG. 2 is a schematic block diagram of a fiber laser amplifier system 40 that employs polarization control of the seed beam as one embodiment for the first type of technique for reducing FM to AM conversion that co-aligns the peaks or nulls of the spectral transmission caused by the component 20 with the center wavelength of the seed beam, where like elements to the system 10 are identified by the same reference number. In the amplifier system 40, the actuator 18 is replaced with a polarization actuator 42. More specifically, the sample beam 32 is not polarization filtered for a specific SOP, but unpolarized light in the sample beam 32 is detected and is used to adjust the polarization of the seed beam so that the non-uniform spectral transmission caused by the component 20 does not generate amplitude modulation.

In this embodiment, the sample beam 32 is detected by a high-speed photodetector 44 that generates a photocurrent having a time varying electrical AC signal that is proportional to optical power fluctuations caused by the amplitude modulation on the sample beam 32 and has a DC offset that is proportional to the optical power of the sample beam 32. The photocurrent is filtered by a high-pass filter 46 to remove the DC offset. The filter 46 has a cut-off frequency that is less than the detection bandwidth of the photodetector 44 and higher than the desired feedback control loop rate. The AC signal that is passed by the filter 46 is rectified by a rectifier 48 to convert the negative parts of the signal to positive parts. The rectified signal is filtered and time-averaged by a low-pass filter 52 to provide a control metric signal that is proportional to the amplitude modulation or RIN power in the sample beam 32 that is provided to a polarization controller 50. The low pass filter 52 has a cutoff frequency that is higher than the desired feedback control loop rate, but small enough to provide good signal-to-noise ratio for the control metric signal to enable stable feedback control. The polarization controller 50 provides a control signal to the polarization actuator 42 depending on the magnitude and dynamics of the control metric signal. The control metric signal changes or adjusts the polarization of the seed beam to cause the peaks or nulls of the spectral transmission created by the component 20 to be shifted to align with the center wavelength of the seed beam. In other words, by changing the polarization of the seed beam, the spectral transmission of the seed beam caused by the optical component 20 will be shifted, and by monitoring the magnitude of the amplitude modulation, the optimum polarization can be provided to the seed beam to minimize the amplitude modulation.

The system 40 does generate a low-noise FM amplified output laser beam, however, the output beam 26 will be indeterminately polarized based on the uncontrolled birefringence of the fiber components. This is acceptable for applications that do not require polarized seed beams, such as beam-combined laser architectures that are based on SBC using polarization-independent combining gratings. However, the laser system 40 may not be useful for applications that require polarized seed beams, such as beam-combined laser weapon architectures based on CBC or based on SBC using polarization-dependent gratings.

Figure 3:
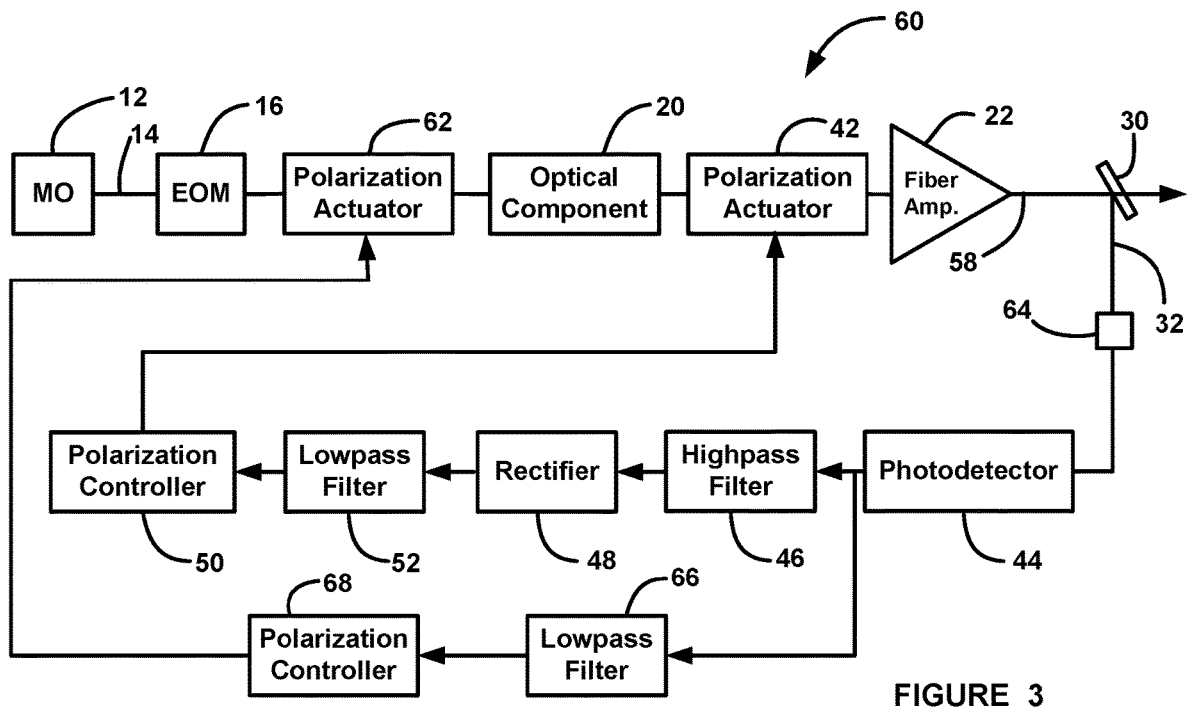
FIG. 3 is a schematic block diagram of a fiber laser amplifier system that reduces FM to AM conversion using active polarization control and provides seed beam SOP control.

FIG. 3 is a schematic block diagram of a fiber laser amplifier system 60 that provides polarization control to reduce FM to AM conversion as discussed above and also provides polarization control of the seed beam to generate an output beam 58 that is polarized to a certain polarization state, where like elements to the system 40 are identified by the same reference number. The system 60 includes a polarization actuator 62 that adjusts the SOP of the seed beam to the desired polarization state for the particular application, which is not the same polarization control provided by the polarization actuator 42 in the system 40 that changed the polarization of the seed beam to align the peaks and nulls in the transmission spectrum caused the component 20 to the center frequency of the seed beam. The sample beam 32 is filtered by a polarization filter 64 that transmits optical power of the sample beam 32 in the desired polarization state. The polarization-filtered sample beam is detected by the high-speed photodetector 44 that generates a photocurrent having a time varying electrical AC signal that is proportional to optical power fluctuations caused by the amplitude modulation on the sample beam 32 and has a DC offset that is proportional to the optical power of the sample beam 32 that is in the desired polarization state. The SOP of the output beam 58 is controlled by providing the electrical signal from the photodetector 44 to a low-pass filter 66 that filters out the frequency fluctuations so that the DC offset identifying the magnitude of the sample beam 32 having the desired polarization remains. The filtered signal is provided to a polarization controller 68 that controls the polarization actuator 62 to adjust the polarization of the seed beam to maximize the amount of power that is provided by the polarization filter 64. The cut-off frequency of the low-pass filter 66 is selected based on the desired loop rate of the polarization control loop, for example, 1-100 kHz, where the cut-off frequency of the high-pass filter 46 is selected to be greater than the cut-off frequency of the low-pass filter 66, but less than the bandwidth of the photodetector 44.

Because the polarization actuator 62 does control the polarization of the seed beam to the desired SOP it also alters the position of the peaks and nulls of the transmission spectrum caused by the optical component 20, which could increase or decrease the amount of amplitude modulation the component 20 creates. In the system 60, the polarization actuator 42 is moved downstream of the component 20 to provide the shift in the spectral transmission of the seed beam. As mentioned above, the control bandwidth or sampling frequency of the polarization control for reducing FM to AM conversion is selected to be much slower than the control bandwidth of the output beam polarization control to ensure the output SOP remains locked to the desired polarization. It is possible to move the polarization actuator 42 downstream of the component 20 in this embodiment and still be effective to reduce FM to AM conversion because the polarization actuator 62 responds to changes in the polarization made by the polarization actuator 42 to maintain the output SOP. Because the polarization actuator 62 changes the polarization of the seed beam in response to changes made by the polarization actuator 42, the polarization of the seed beam is effectively being changed by the polarization actuator 42 only at locations between the actuator 62 and the actuator 42 in the optical train, i.e., the SOP is constant at all other locations.

Figure 4:
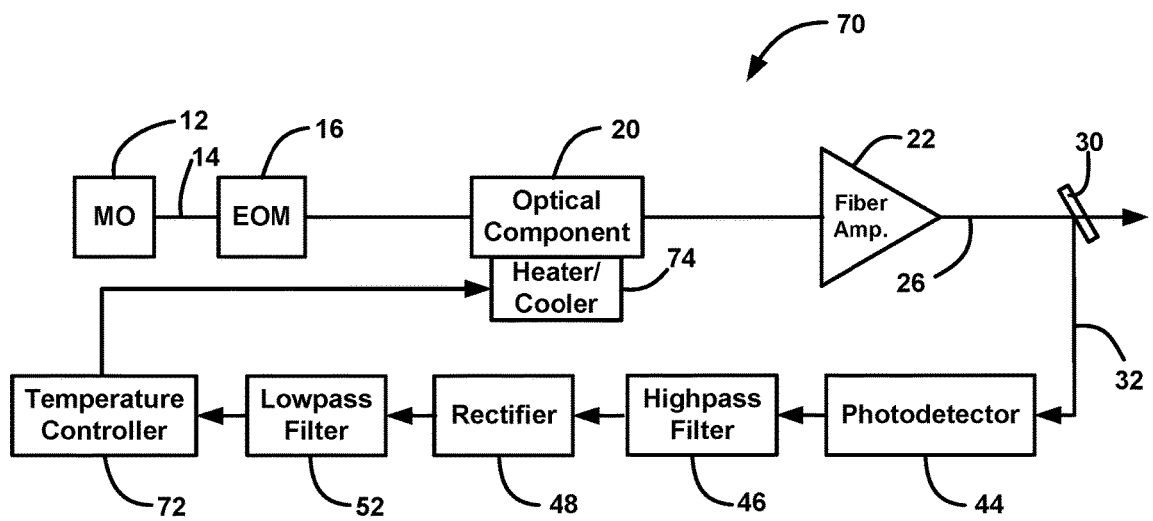
FIG. 4 is a schematic block diagram of a fiber laser amplifier system that reduces FM to AM conversion using active temperature control.

FIG. 4 is a schematic block diagram of a fiber laser amplifier system 70 that employs active temperature control as another embodiment for the first type of technique for reducing FM to AM conversion that co-aligns the peaks or nulls of the spectral transmission caused by the component 20 with the center wavelength of the seed beam, where like elements to the system 40 are identified by the same reference number. The control metric signal that is proportional to the AM power in the sample beam 32 is provided to a temperature controller 72 that controls the temperature of a heater/cooler device 74 that is coupled to and operates to change the temperature of the optical component 20, where the device 74 is the actuator 18 in this embodiment. Therefore, depending on the magnitude of the control metric signal from the low-pass filter 52, the temperature controller 72 will increase or decrease the temperature of the component 20, which causes its spectral transmission to be shifted so that the peaks or nulls are aligned with the center frequency of the seed beam.

Figure 5:
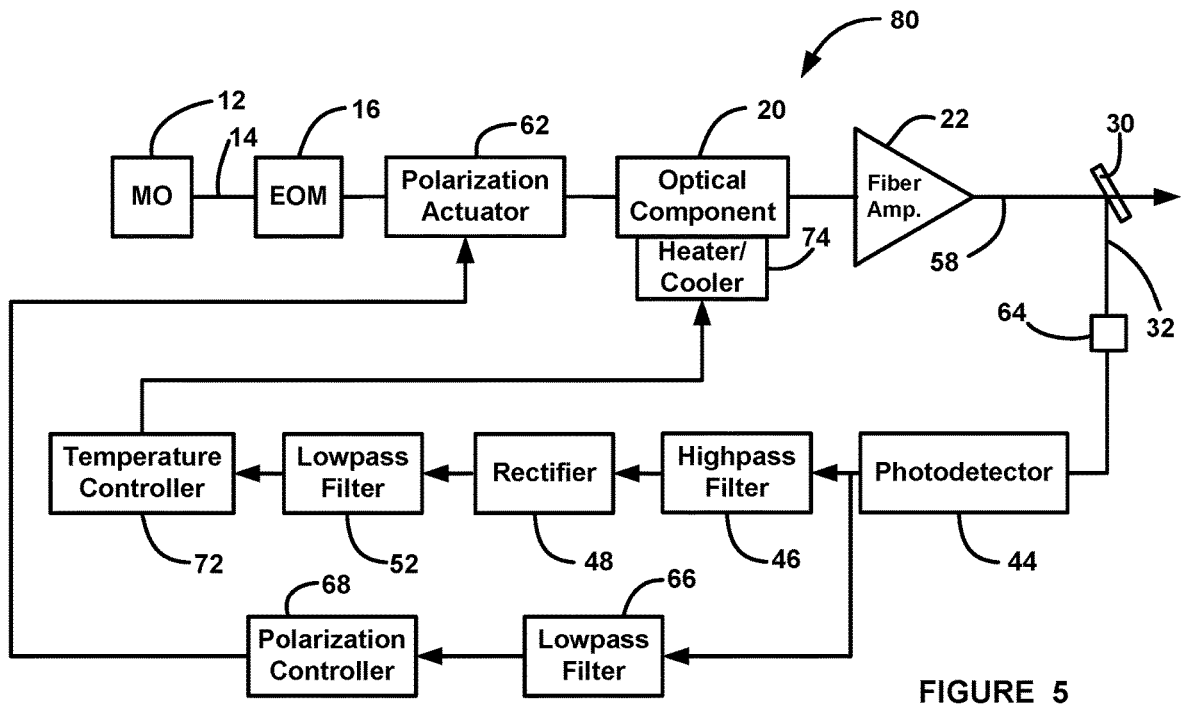
FIG. 5 is a schematic block diagram of a fiber laser amplifier system that reduces FM to AM conversion using active temperature control and provides seed beam SOP control.

FIG. 5 is a schematic block diagram of a fiber laser amplifier system 80 that provides temperature control of the optical component 20 to reduce FM to AM conversion as discussed above and also provides the polarized output beam 58 that is polarized to a desired polarization state, where like elements to the systems 60 and 70 are identified by the same reference number. In order to correct for the conversion of FM to AM, the same process used by the system 70 is employed to control the temperature of the optical component 20. Changing the temperature of the component 20 can also change its birefringence, however these changes are sufficiently slow that they will appear adiabatic to the polarization controller 68 with typical bandwidths of 100 Hz or more, and can be dynamically compensated so that the amplified output beam 58 will simultaneously have a low-RIN and be properly polarized. Therefore, the polarization actuator 62 can operate quickly to change the polarization state of the seed beam to the desired polarization, where the correction for FM to AM conversion provided by the temperature controller 72 can operate more slowly.

The discussion above concerning the first type of technique for reducing FM to AM conversion that co-aligns the peaks or nulls of the spectral transmission caused by the component 20 with the center wavelength of the seed beam was specific to providing polarization control or temperature control. However, it is noted that these are merely examples of suitable techniques for aligning the peaks and nulls of the spectral transmission of the component 20 with the center frequency of the seed beam, where other techniques may be equally applicable. For example, it may be possible to control mechanical stress on the optical component 20 to change its birefringence, which could also operate to shift the non-uniform spectral transmission of the component 20 to align with the center wavelength of the seed beam. In this embodiment, the device 74 would be a device that applies mechanical stress to the optical component 20 and the controller 72 would be a stress controller.

Figure 6:
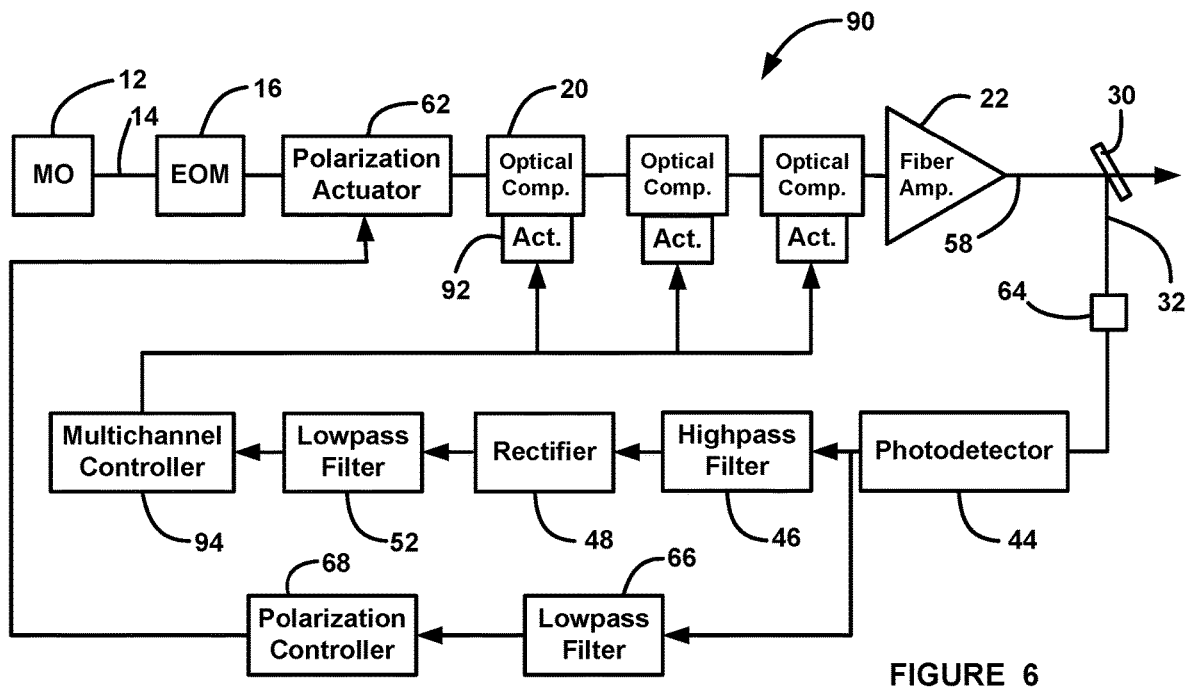
FIG. 6 is a schematic block diagram of a fiber laser amplifier system that reduces FM to AM conversion using active control for multiple optical components.

As noted, a number of components in a fiber laser amplifier system could cause non-uniform spectral transmission produced by AM. Therefore, it may be desirable to provide AM reducing control to multiple or all of the various components that are in the amplification chain. This embodiment is illustrated in FIG. 6 by fiber laser amplifier system 90, where like elements to the system 80 are identified by the same reference number. The system 90 includes multiple optical components 20 positioned between the polarization actuator 62 and the fiber amplifier 22, where each optical component 20 includes some type of actuation device 92, such as a temperature actuator, polarization actuator, stress actuator, etc., as discussed above. A multi-dither control scheme, for example, a stochastic parallel gradient descent (SPGD) algorithm can be employed to simultaneously control multiple components to minimize FM to AM conversion. Such a controller is illustrated by multi-channel controller 94 that controls each of the actuators 92 to independently shift the spectral transmission caused by each of the components 20 to align the peaks or nulls with the center wavelength of the seed beam.

The second type of technique referred to above that reduces FM to AM conversion by providing spectral equalization, which is a more direct technique than the first type of technique, uses a programmable spectral filter as the actuator 18 in the system 10 that operates to flatten or equalize the net spectral transmission profile of the seed beam propagating through the fiber amplifier system 10. If the spectral transmission of the seed beam through all of the optical components from the MO 12 through the fiber amplifier 22 is initially a transmission function $T_1(\lambda)$ without the programmable spectral filter, then by using a spectral filter programmed to produce an inverse transmission function $T_2(\lambda)=1/T_1(\lambda)$, the net spectral transmission of the seed beam after it propagates through the system 10 will be $T_1(\lambda)T_2(\lambda)=1$, which should yield a low noise output beam. In general, both of the transmission functions $T_1(\lambda)$ and $T_2(\lambda)$ can be complex-valued functions, i.e., both spectral amplitude and phase can be non-uniform. Thus, the seed beam is pre-distorted with the inverse of the transmission function of the fiber amplifier system 10 so that the non-uniform spectral transmission of the seed beam changes its transmission function to its original transfer function as it propagates through the system 10 so that it does not include amplitude modulation. This approach has advantages over the first type of technique because it can, in principle, compensate for FM to AM conversion arising from multiple sources. In other words, this technique can correct arbitrary impairment to the spectral transmission and is not limited to periodic spectral transmission profiles.

Figure 7:
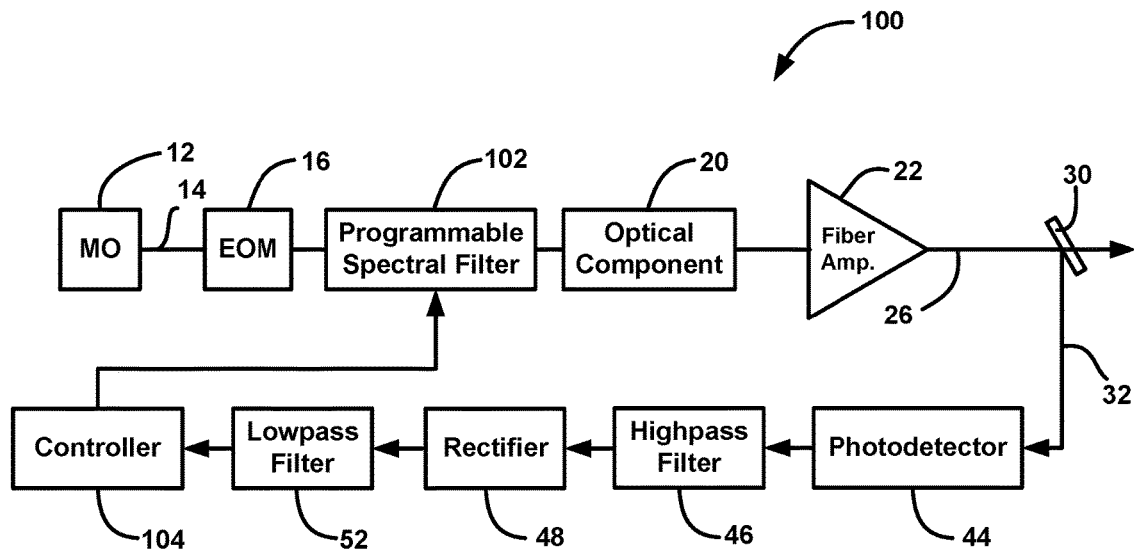
FIG. 7 is a schematic block diagram of a fiber laser amplifier system that reduces FM to AM conversion using a programmable spectral filter that flattens or equalizes the spectral transmission of the seed beam propagating through the amplifier system.

FIG. 7 is a schematic block diagram of a fiber laser amplifier system 100 that employs spectral equalization control of the seed beam as a general depiction of this embodiment for the second type of technique for reducing FM to AM conversion, where like elements to the system 40 are identified by the same reference number. In this embodiment, the polarization actuator 42 is replaced with a programmable spectral filter 102 that provides pre-distortion of the seed beam as an inverse of the spectral distortion provided by the components in the amplification chain prior to the seed beam being sent to the fiber amplifier 22. In this embodiment, the system 100 uses the photodetector 44, the high-pass filter 46, the rectifier 48 and the low-pass filter 52 in the manner discussed above to generate the control metric signal proportional to AM power in the sample beam 32 that identifies the non-uniform spectral transmission. A controller 104 receives the control metric signal from the low-pass filter 52 and controls the spectral filter 102 to provide the desired inverse transmission function that drives the metric signal to zero, and thus reduces the FM to AM conversion.

Figure 8:
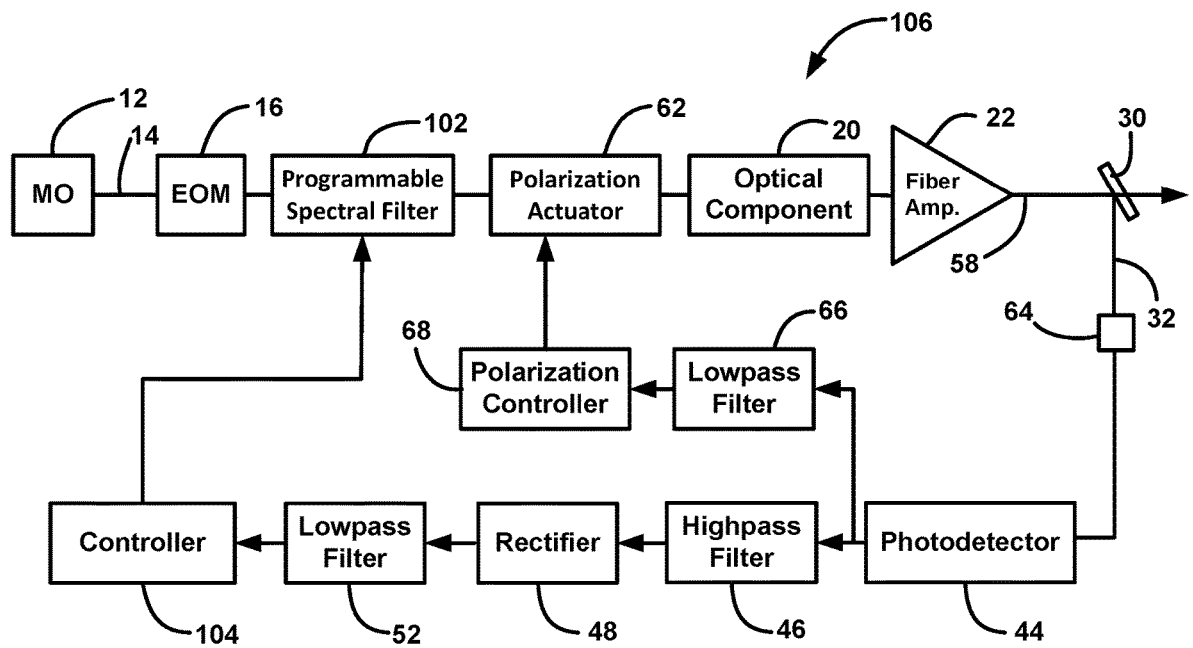
FIG. 8 is a schematic block diagram of a fiber laser amplifier system that reduces FM to AM conversion using a programmable spectral filter that flattens or equalizes the spectral transmission of the seed beam propagating through the amplifier system and provides seed beam SOP control.

If, as discussed above, the fiber laser amplifier system needs to provide the polarized output beam 58 for a certain application, then polarization control can be provided in the same manner as discussed above. This embodiment is shown in FIG. 8 as fiber laser amplifier system 106, where like elements to the systems 60 and 100 are identified by the same reference number.

The discussion above provides feedback control to the spectral filter 102 using an advanced algorithm to obtain the spectral shape that minimizes AM. A simpler approach might involve a simple multi-variable controller based on adjusting one or more parameters associated with a Taylor expansion of the spectral transmission around the center wavelength of the seed beam. For example, a spectral transmission could be imposed on the seed beam that varies linearly with wavelength, where the control parameter is the slope of the spectral transmission curve that would serve to grossly compensate the lowest order spectral non-uniformity. Parameters could also be included to compensate quadratically varying spectral transmissions or even higher order terms. Typically, the lowest order term spectral phase that is of interest is quadratic that corresponds to group velocity dispersion (GVD) since linearly varying spectral phase simply corresponds to a constant time delay and does not impact FM to AM conversion.

Figure 9:
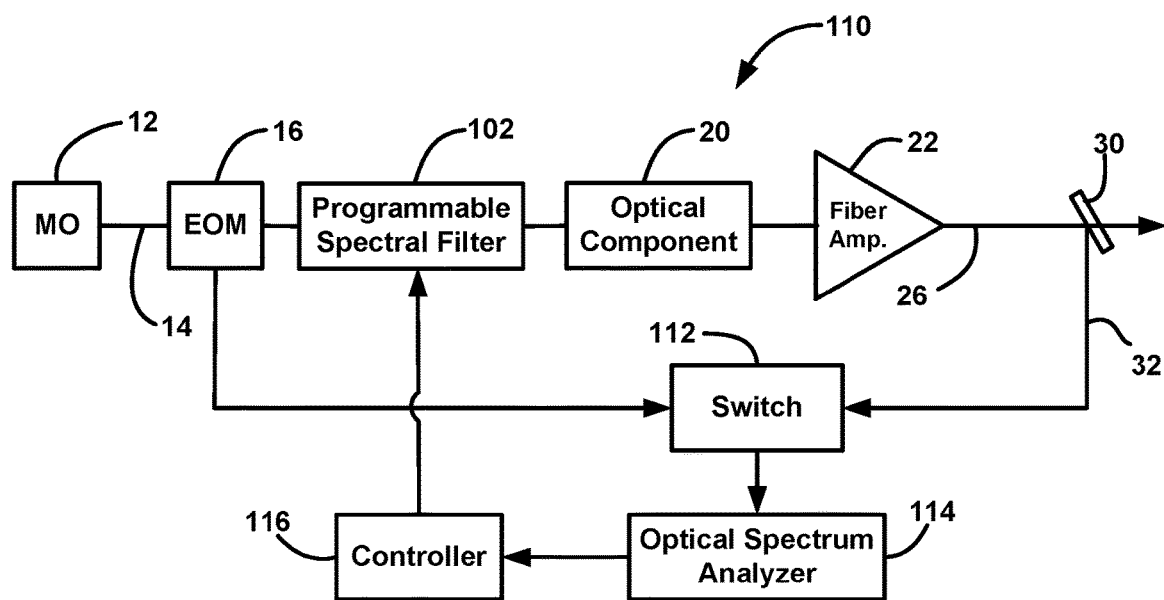
FIG. 9 is a schematic block diagram of a fiber laser amplifier system that reduces FM to AM conversion using a programmable spectral filter that flattens or equalizes the spectral transmission of the seed beam propagating through the amplifier system and employs an optical spectrum analyzer for measuring the input and output power spectrums of the seed beam.

In an alternate embodiment for the second type of technique, the detector 34 could be a spectral detector, such as a spectrometer or an optical spectrum analyzer, that provides measurements of both an output power spectrum $S_{out}(\lambda)$ of the sample beam 32 and an input power spectrum $S_{in}(\lambda)$ of the seed beam before it is sent to the programmable spectral filter 102. This embodiment is shown as fiber laser amplifier system 110 in FIG. 9, where like elements to the system 100 are identified by the same reference number. The system 110 includes a switch 112 that receives the sample beam 32 having the output power spectrum $S_{out}(\lambda)$ and the seed beam from the EOM 16 having the input power spectrum $S_{in}(\lambda)$. The switch 112 toggles back and forth at a desired sampling rate between the input and output power spectrums and an optical spectrum analyzer 114 alternately measures the magnitude of those power spectrums. A controller 116 receives the measured magnitudes of the power spectrums, calculates the net system transmission function $T_1(\lambda)=S_{out}(\lambda)/S_{in}(\lambda)$ and controls the programmable spectral filter 102 to apply the inverse transmission function $T_2(\lambda)=1/T_1(\lambda)$ to the seed beam. In an alternate embodiment, two optical spectrum analyzers could be employed, where each analyzer measures one of the power spectrums. In another alternate embodiment, for situations in which the input power spectrum $S_{in}(\lambda)$ is constant in time, the input power spectrum could be stored in the memory of the controller 104 and only the output power spectrum $S_{out}(\lambda)$ would be dynamically measured using a single optical spectrum analyzer. To avoid dynamic instability in a closed loop configuration, the controller 116 would typically be programmed to apply a small correction to the transmission function $T(\lambda)$ upon each loop in the iteration. For example, for the $n^{th}$ iteration of the closed loop as:

$$T_2^{(n)}(\lambda)=K^*[T_2^{(n-1)}(\lambda)+g^*1/T_1^{(n)}(\lambda)], \quad (1)$$

where n denotes the $n^{th}$ loop iteration, g<1 is a gain coefficient set to balance stability against loop convergence speed, i.e., dynamic control bandwidth, and K is a normalization constant set to maximize $T_2$.

It is noted that use of the optical spectrum analyzer 114 in the system 110 is only able to measure the spectral amplitude of the input power and the output power, but cannot provide FM to AM conversion compensation for the spectral phase. However, typically in these types of systems, the spectral phase is not time varying, and is thus fixed. Fiber dispersion can typically be compensated for with a one-time calibration measurement since it is not expected to change dynamically during normal use of the fiber laser amplifier system. Thus, active control to reduce FM to AM conversion may not be required for all system parameters.

Figure 10:
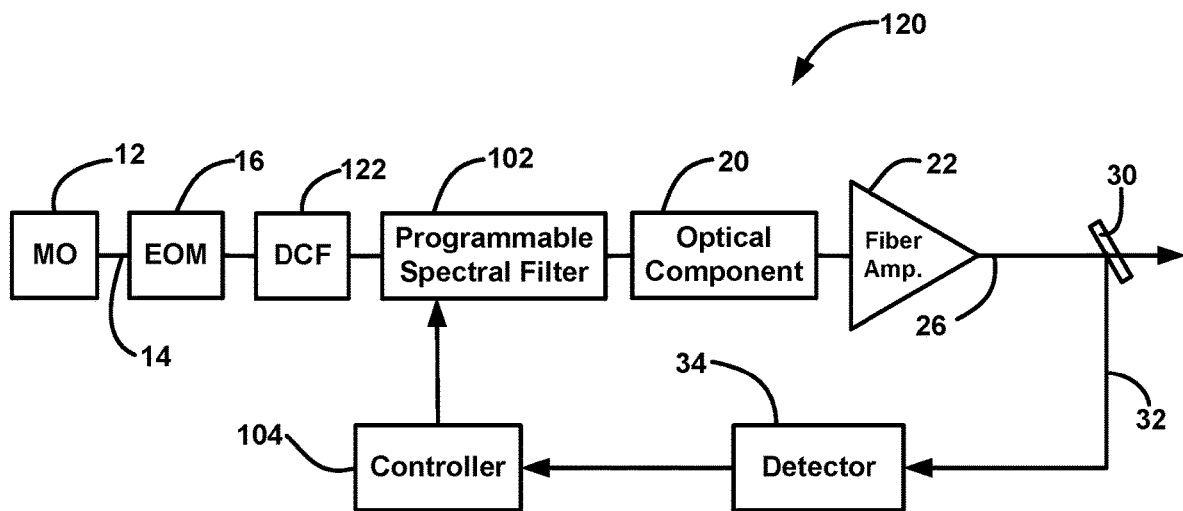
FIG. 10 is a schematic block diagram of a fiber laser amplifier system that reduces FM to AM conversion using a programmable spectral filter that flattens or equalizes the spectral transmission of the seed beam propagating through the amplifier system and includes a dispersion compensating fiber.

To provide the compensation for fiber dispersion and provide spectral phase correction, a dispersion compensating fiber (DCF) could be used in the amplification chain before the fiber amplifier 22 to address static GVD and decrease the amount of spectral phase correction needed by the active control or provide the spectral phase control. This embodiment is shown in FIG. 10 as fiber laser amplifier system 120, where like components to the systems 10 and 100 are identified by the same reference number. In the system 120, a DCF 122 is provided before the programmable spectral filter 102 that provides the spectral phase correction. Providing the DCF 122 as shown benefits the system 110 by providing static compensation for spectral phase that was not available from the spectrum analyzer 114, but also benefits the system 100 by off-loading most of the spectral phase correction for FM to AM conversation to the DCF 122, where additional spectral phase correction is provided by the controller 116.

As discussed above, some laser amplifier systems employ a multichannel or SBC architecture. The use of a programmable spectral filter to reduce FM to AM conversion has particular application for these types of SBC architectures because a single programmable spectral filter can provide FM to AM conversion compensation for an entire array of spectrally beam combined fiber amplifiers. This not only enables higher per-fiber powers and long delivery fiber cabling, but also eliminates expensive components, such as electro-optic modulators and high frequency RF drive electronics, by allowing multiplexing of all seed beam wavelengths through a single modulator channel.

Figure 11:
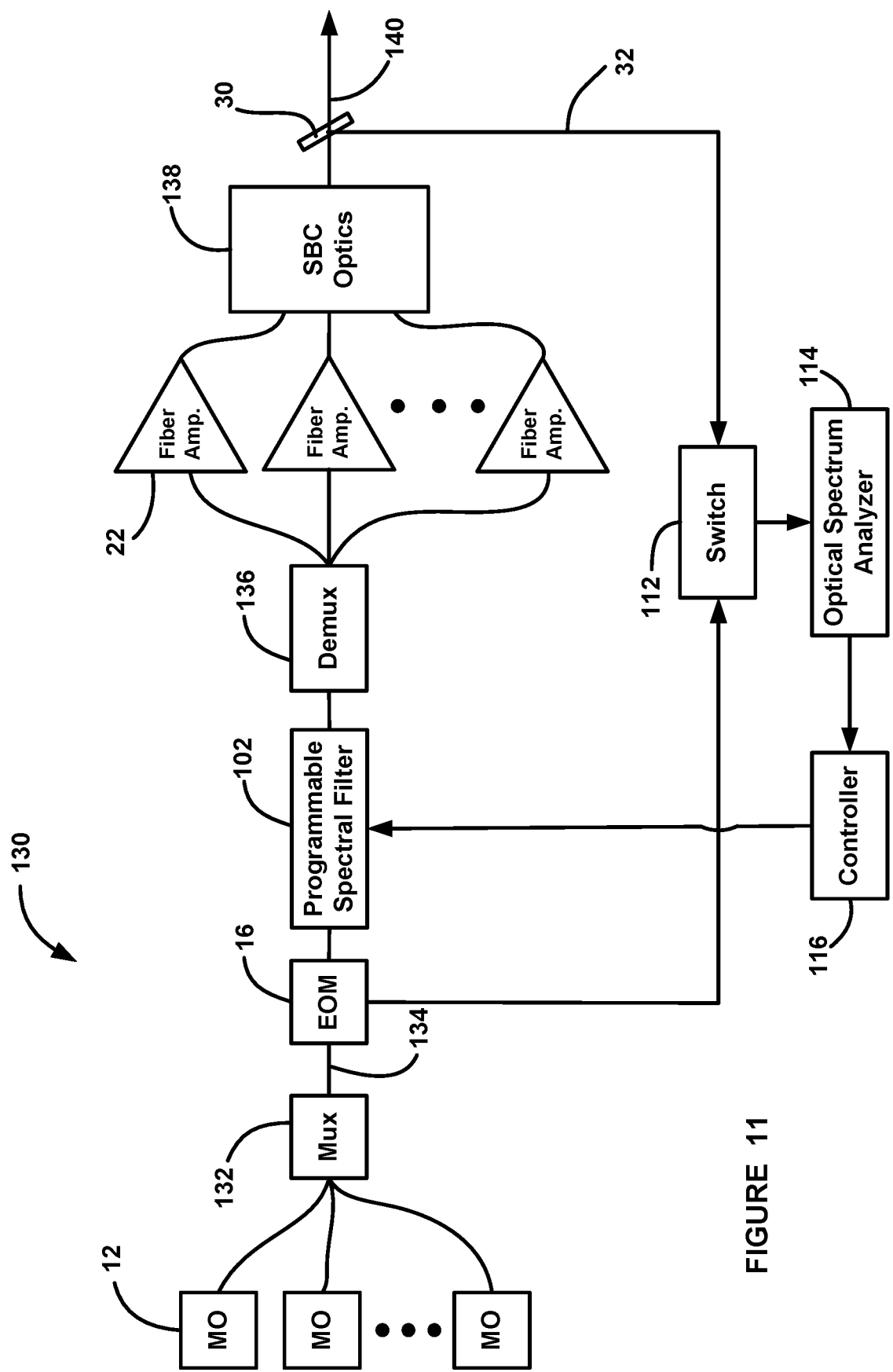
FIG. 11 is a schematic block diagram of a fiber laser amplifier system that reduces FM to AM conversion using a programmable spectral filter that flattens or equalizes the spectral transmission of the seed beam propagating through the amplifier system and employs SBC.

This embodiment is illustrated by fiber laser amplifier system 130 in FIG. 11, where like elements to the system 100 are identified by the same reference number. The system 130 includes a plurality of master oscillators 12, where each master oscillator 12 generates a seed beam at a different wavelength λ. All of the seed beams are provided to a wavelength division multiplexer 132 that combines the beams on to a single fiber 134. Once all of the seed beams are on the same fiber, and are frequency modulated by the EOM 16, the programmable spectral filter 102 can provide the spectral filtering in the manner discussed above to pre-distort all of the seed beams of different wavelengths propagating therethrough with the inverse transmission function. Once all of the seed beams have been pre-distorted, they are sent to a wavelength division demultiplexer 136 that separates the pre-distorted different wavelength seed beams onto separate fibers to be sent to separate fiber amplifiers 22. Once the individual beams are amplified at their respective wavelengths, they are combined by SBC optics 138 to generate a high-power output beam 140. The input power spectrum from the EOM 16 and the output power spectrum from the sample beam 32 are alternately measured by the optical spectrum analyzer 114 and the controller 116 calculates the net system transmission function in the manner discussed so that the controller 116 can control the programmable spectral filter 102. It is noted that the spectrum analyzer can be replaced with the detection embodiment that employs the photodetector 44, the high-pass filter 46, the rectifier 48 and the low-pass filter 52, as discussed above.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A fiber amplifier system comprising:
    at least one optical source providing at least one optical seed beam;
    a plurality of optical components in an amplification chain and being responsive to the seed beam, wherein one of the optical components is at least one fiber amplifier responsive to the seed beam and generating an amplified output beam, and wherein one or more of the optical components causes frequency modulation (FM) to amplitude modulation (AM) conversion to the seed beam causing amplitude modulation that creates a non-uniform spectral transmission of the seed beam having a transmission function;
    a programmable spectral filter provided within the amplification chain and being operable to pre-distort the seed beam by applying an inverse of the transmission function that creates a net uniform transmission function by equalizing a net spectral transmission profile of the seed beam at an end of the amplification chain to reduce the amplitude modulation;
    a beam sampler responsive to the amplified output beam that provides a sample beam;
    a detector sub-system responsive to the sample beam that detects an amount of the amplitude modulation on the seed beam, said detector sub-system generating a control metric signal identifying the amount of amplitude modulation; and
    a spectral controller responsive to the control metric signal from the detector sub-system and controlling the programmable spectral filter to generate the inverse of the transmission function.

2. The fiber amplifier system according to claim 1 wherein the plurality of optical components are selected from the group consisting of a pump beam combiner, an optical fiber splice, an optical isolator, a spectral filter, a pre-amplifier stage, a length of fiber and a mode field adapter.

3. The fiber amplifier system according to claim 1 wherein the detector sub-system includes a photodetector that is responsive to the sample beam and generates a time-varying electrical signal including fluctuations identifying the amount of the amplitude modulation and a DC offset identifying a power of the sample beam, a high-pass filter that filters out the DC offset in the electrical signal, a rectifier that rectifies the high-pass filtered signal and a low-pass filter that low-pass filters the rectified signal and generates the control metric signal.

4. The fiber amplifier system according to claim 1 wherein the detector sub-system includes at least one spectral detector that measures an output power spectrum of the sample beam, said spectral controller calculating the net transmission function as the output power spectrum divided by an input power spectrum of the seed beam before it is sent to the spectral filter, and causing the spectral filter to apply the inverse of the transmission function to the seed beam.

5. The fiber amplifier system according to claim 4 wherein the at least one spectral detector is a first spectral detector that measures the input power spectrum and a second spectral detector that measures the output power spectrum.

6. The fiber amplifier system according to claim 4 wherein the at least one spectral detector is a single spectral detector that measures both the input power spectrum and the output power spectrum, and wherein the detector sub-system further includes a switch responsive to the input power spectrum and the output power spectrum, said switch alternately providing the input and output power spectrums to the at least one spectral detector.

7. The fiber amplifier system according to claim 4 wherein the input power spectrum is constant in time and is stored in the spectral controller.

8. The fiber amplifier system according to claim 1 wherein one of the optical components in the amplifier chain is a dispersion compensating fiber (DSF) that provides spectral phase compensation that reduces amplitude modulation caused by spectral phase.

9. The fiber amplifier system according to claim 1 further comprising a state of polarization (SOP) actuator, a SOP polarization controller, and a polarization filter that only allows a predetermined polarization of the sample beam that is sent to the detector sub-system, said detector sub-system including a low-pass filter that filters out fluctuations identifying the amount of amplitude modulation in the sample beam, wherein the low-pass filtered signal is sent to the SOP polarization controller that controls the SOP polarization actuator to change the SOP of the seed beam to maintain the output beam at a desired SOP.

10. The fiber amplifier system according to claim 1 wherein the amplifier system includes spectral beam combining (SBC), said at least one optical source being a plurality of optical sources each generating a seed beam at a different wavelength and said at least one fiber amplifier being a plurality of fiber amplifiers each amplifying one of the seed beams, said amplifier system further comprising a multiplexer that multiplexes all of the seed beams onto a common fiber that sends all of the seed beams to the programmable spectral filter and a demultiplexer that separates all of the pre-distorted seed beams onto separate fibers before being sent to the amplifiers for amplification, said amplifier system further comprising an SBC optical system that combines the amplified fiber beams into a single beam prior to the beam sampler.

11. The fiber amplifier system according to claim 1 wherein the spectral controller is a multi-variable controller that adjusts one or more parameters associated with a Taylor expansion of the spectral transmission.

12. The fiber amplifier system according to claim 1 wherein the spectral controller generates the inverse of the transmission function in small increments for each sample period.

13. A fiber amplifier system that includes spectral beam combining (SBC), said amplifier system comprising:
    at least one optical source providing at least one optical seed beam;
    a plurality of optical components in an amplification chain and being responsive to the seed beam, wherein one of the optical components is at least one fiber amplifier responsive to the seed beam and generating an amplified output beam, and wherein one or more of the optical components causes frequency modulation (FM) to amplitude modulation (AM) conversion to the seed beam causing amplitude modulation that creates a non-uniform spectral transmission of the seed beam having a transmission function;

a programmable spectral filter provided within the amplification chain and being operable to pre-distort the seed beam by applying an inverse of the transmission function that creates a net uniform transmission function by equalizing a net spectral transmission profile of the seed beam at an end of the amplification chain to reduce the amplitude modulation;

a beam sampler responsive to the amplified output beam that provides a sample beam;

a detector sub-system responsive to the sample beam and including a switch and an optical spectrum analyzer, said switch being responsive to an input power spectrum of the seed beam before it is sent to the spectral filter and an output power spectrum of the sample beam, said switch alternately providing the input and output power spectrums to the optical spectrum analyzer and the optical spectrum analyzer measuring the input and output power spectrums; and a spectral controller being responsive to the measured input and output power spectrums from the spectrum analyzer and calculating the net transmission function as the output power spectrum divided by the input power spectrum, said spectral controller causing the spectral filter to apply the inverse of the transmission function to the seed beam.

14. The fiber amplifier system according to claim 13 wherein one of the optical components in the amplifier chain is a dispersion compensating fiber (DSF) that provides spectral phase compensation that reduces amplitude modulation caused by spectral phase.

15. The fiber amplifier system according to claim 13 wherein the at least one optical source is a plurality of optical sources each generating a seed beam at a different wavelength and said at least one fiber amplifier being a plurality of fiber amplifiers each amplifying one of the seed beams, said amplifier system further comprising a multiplexer that multiplexes all of the seed beams onto a common fiber that sends all of the seed beams to the programmable spectral filter and a demultiplexer that separates all of the pre-distorted seed beams onto separate fibers before being sent to the amplifiers for amplification, said amplifier system further comprising an SBC optical system that combines the amplified fiber beams into a single beam prior to the beam sampler.

16. The fiber amplifier system according to claim 13 further comprising a state of polarization (SOP) actuator, a SOP polarization controller, and a polarization filter that only allows a predetermined polarization of the sample beam that is sent to the detector sub-system, said detector sub-system including a low-pass filter that filters out fluctuations identifying the amount of amplitude modulation in the sample beam, wherein the low-pass filtered signal is sent to the SOP polarization controller that controls the SOP polarization actuator to change the SOP of the seed beam to maintain the output beam at a desired SOP.

17. A fiber amplifier system that includes spectral beam combining (SBC), said amplifier system comprising:

at least one optical source providing at least one optical seed beam;

a plurality of optical components in an amplification chain and being responsive to the seed beam, wherein one of the optical components is at least one fiber amplifier responsive to the seed beam and generating an amplified output beam, and wherein one or more of the optical components causes frequency modulation (FM) to amplitude modulation (AM) conversion to the seed beam causing amplitude modulation that creates a non-uniform spectral transmission of the seed beam having a transmission function;

a programmable spectral filter provided within the amplification chain and being operable to pre-distort the seed beam by applying an inverse of the transmission function that creates a net transmission function of about one by equalizing a net spectral transmission profile of the seed beam at an end of the amplification chain to reduce the amplitude modulation;

a beam sampler responsive to the amplified output beam that provides a sample beam;

a detector sub-system responsive to the sample beam that detects an amount of the amplitude modulation on the seed beam, detector sub-system including a photodetector that is responsive to the sample beam and generates a time-varying electrical signal including fluctuations identifying the amount of the amplitude modulation and a DC offset identifying a power of the sample beam, a high-pass filter that filters out the DC offset in the electrical signal, a rectifier that rectifies the high-pass filtered signal and a low-pass filter that low-pass filters the rectified signal and generates a control metric signal identifying the amount of amplitude modulation; and a spectral controller responsive to the control metric signal from the detector sub-system and controlling the programmable spectral filter to generate the inverse of the transmission function.

18. The fiber amplifier system according to claim 17 wherein one of the optical components in the amplifier chain is a dispersion compensating fiber (DSF) that provides spectral phase compensation that reduces amplitude modulation caused by spectral phase.

19. The fiber amplifier system according to claim 17 wherein the at least one optical source is a plurality of optical sources each generating a seed beam at a different wavelength and said at least one fiber amplifier being a plurality of fiber amplifiers each amplifying one of the seed beams, said amplifier system further comprising a multiplexer that multiplexes all of the seed beams onto a common fiber that sends all of the seed beams to the programmable spectral filter and a demultiplexer that separates all of the pre-distorted seed beams onto separate fibers before being sent to the amplifiers for amplification, said amplifier system further comprising an SBC optical system that combines the amplified fiber beams into a single beam prior to the beam sampler.

20. The fiber amplifier system according to claim 17 further comprising a state of polarization (SOP) actuator, a SOP polarization controller, and a polarization filter that only allows a predetermined polarization of the sample beam that is sent to the detector sub-system, said detector sub-system including a low-pass filter that filters out fluctuations identifying the amount of amplitude modulation in the sample beam, wherein the low-pass filtered signal is sent to the SOP polarization controller that controls the SOP polarization actuator to change the SOP of the seed beam to maintain the output beam at a desired SOP.

\* \* \* \* \*